US011115387B2

(12) United States Patent
Bosch et al.

(10) Patent No.: US 11,115,387 B2
(45) Date of Patent: Sep. 7, 2021

(54) METHOD FOR POLICY-DRIVEN, CLASSIFYING, AND ROUTING TRAFFIC USING THE DOMAIN NAME SYSTEM

(71) Applicant: Cisco Technology, Inc., San Jose, CA (US)

(72) Inventors: Peter Bosch, MN Aalsmeer (NL); Alessandro Duminuco, Milan (IT); Jeffrey Napper, BG Delft (NL); Sape Jurrien Mullender, KA Amsterdam (NL); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 16/373,055

(22) Filed: Apr. 2, 2019

(65) Prior Publication Data

US 2020/0252374 A1 Aug. 6, 2020

Related U.S. Application Data

(60) Provisional application No. 62/800,967, filed on Feb. 4, 2019.

(51) Int. Cl.
*H04L 29/06* (2006.01)
*H04L 29/12* (2006.01)
*H04L 12/46* (2006.01)

(52) U.S. Cl.
CPC ...... *H04L 63/0272* (2013.01); *H04L 12/4641* (2013.01); *H04L 61/1511* (2013.01); *H04L 61/2007* (2013.01); *H04L 63/0281* (2013.01); *H04L 63/20* (2013.01)

(58) Field of Classification Search
CPC ............ H04L 63/0272; H04L 63/0281; H04L 61/2007; H04L 61/1511; H04L 12/4641; H04L 63/20; H04L 61/6013
See application file for complete search history.

(56) References Cited

U.S. PATENT DOCUMENTS

| 2004/0225895 | A1* | 11/2004 | Mukherjee | H04L 63/0272 726/15 |
| 2005/0198306 | A1* | 9/2005 | Palojarvi | H04L 63/0272 709/227 |
| 2006/0143702 | A1* | 6/2006 | Hisada | H04L 12/4641 726/15 |
| 2014/0211807 | A1* | 7/2014 | Takenaka | H04L 45/72 370/392 |

(Continued)

*Primary Examiner* — Kevin Bechtel
*Assistant Examiner* — Hamid Talaminaei
(74) *Attorney, Agent, or Firm* — Polsinelli (57) ABSTRACT

Systems, methods, and computer-readable storage media are provided for managing application traffic. A routing policy defines the data flow path between the client device (which uses a virtual private network (VPN) client) and the appropriate network-based service. Based on various factors associated with the user, the client device, and the destination (e.g. network-based service), the routing policy will direct the VPN client to communicate with either a public DNS (via the public Internet) or to a private DNS (via the private Intranet). The resulting IP addresses will be used to establish a particular route (either over a public Internet or private Intranet) between the client device and the network-based service in accordance to the routing policy.

17 Claims, 5 Drawing Sheets

(56) References Cited

U.S. PATENT DOCUMENTS

| | | | |
|---|---|---|---|
| 2014/0259093 A1* | 9/2014 | Narayanaswamy | ........................ H04L 63/0272 726/1 |
| 2020/0162431 A1* | 5/2020 | Goldschlag | ......... H04L 63/0478 |
| 2020/0213265 A1* | 7/2020 | Deshpande | ......... H04L 61/2007 |
| 2020/0287985 A1* | 9/2020 | Sinha | ................ G06F 16/24552 |

* cited by examiner

METHOD FOR POLICY-DRIVEN, CLASSIFYING, AND ROUTING TRAFFIC USING THE DOMAIN NAME SYSTEM

CROSS-REFERENCE TO RELATED APPLICATIONS

The present application claims the priority benefit of U.S. patent application No. 62/800,967 filed Feb. 4, 2019 and entitled "Method for Policy-Driven, Classifying, and Routing Traffic Using the Domain Name System", the disclosure of which is incorporated herein by reference.

TECHNICAL FIELD

The present technology pertains to managing application network traffic, and more specifically for policy-driven classification and routing of traffic using the domain name system.

BACKGROUND

Virtual Private Networks (or VPN) are services that extend a private network across the Internet. VPN applications allow users to send and receive data across shared or public networks as if their computing devices are connected to the private network. To provide security, connections are provided using encrypted layered tunneling protocols and authentication methods.

However, the use of IP (Internet Protocol) addresses to establish the point-to-point secure VPN connections for the user in connection with policy rules is not without issues. For example, the use of IP addresses is non-intuitive to humans although that is how different websites or web-services are organized and located on the Internet. Furthermore, websites and/or web-services may constantly have changing IP addresses based on whether the corresponding source of the website or web-service changes between VPN sessions. Changing IP address can render existing policy rules out-of-date. Therefore, there is a need for an easier way to establish VPN connections that also takes into consideration changes to IP addresses that can occur without the user's knowledge.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed are systems, methods, and non-transitory computer-readable storage media that pertain to a policy-driven classification and routing of traffic using the Domain Name System (DNS). The policy-driven classification and routing is applied to a VPN client to determine which DNS server will be used to resolve domain name requests and how the VPN client will communicate with that DNS server. For example, the policy-driven classification and routing can determine whether to allow user access to particular Internet services over the public Internet using a public DNS service or alternatively over a private/Intra-Internet using a private DNS service.

Overview

Disclosed herein are computer-implemented methods, computer-readable media, and systems for routing traffic. Specifically, the routing of traffic is performing for domain name-based user requests to access a network-based service that is received at the user computing device. A virtual private network (VPN) client receives instructions regarding how to resolve the domain name-based user request and to how/where to route the flow path to the network-based service based on various factors that identify a corresponding routing policy for the VPN client. The domain name-based request is resolved at a domain name system in order to provide the VPN client IP addresses associated with the location of the network-based service. The VPN client can then route the flow path from the user computing device to the network-based service based on the IP address and the routing policy.

DETAILED DESCRIPTION

A brief introductory description of example systems and environments for executing the activities disclosed herein are first disclosed.

Figure 1A:
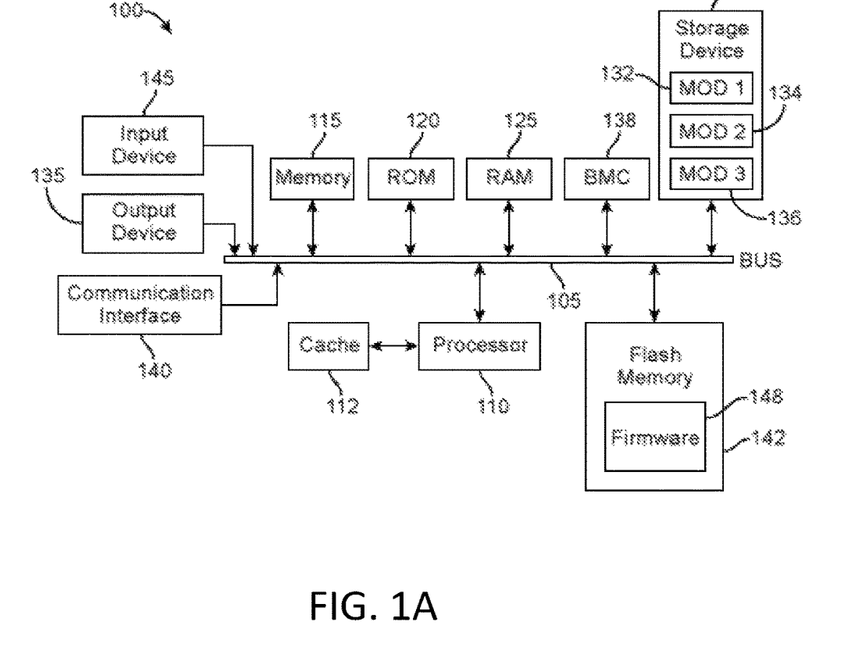
FIG. 1A and FIG. 1B illustrate examples of systems in accordance with some embodiments.
Figure 1B:
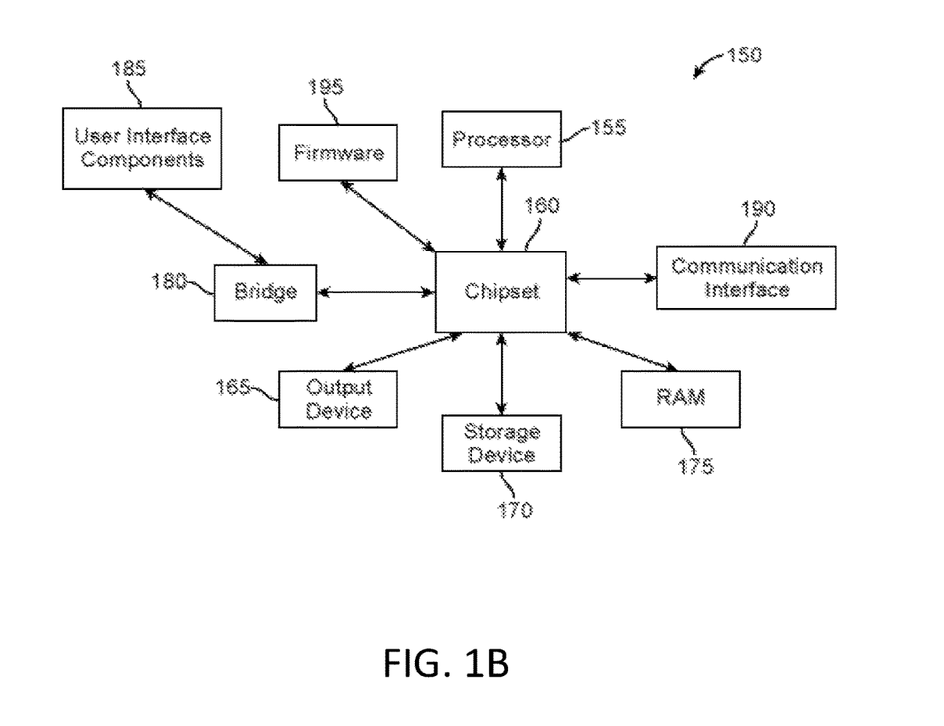

FIG. 1A and FIG. 1B illustrate examples of systems in accordance with some embodiments. For example, the illustrated systems may correspond to one or more computing devices illustrated later in FIG. 2. The more appropriate embodiment will be apparent to those of ordinary skill in the art when practicing the present technology. Persons of ordinary skill in the art will also readily appreciate that other system embodiments are possible.

FIG. 1A illustrates an example architecture for a conventional bus computing system 100 where the components of the system are in electrical communication with each other using a bus 105. The computing system 100 includes a processing unit (CPU or processor) 110 and a system bus 105 that couples various system components including the system memory 115, such as read only memory (ROM) 120 and random access memory (RAM) 125, to the processor 110. The computing system 100 can include a cache 112 of high-speed memory connected directly with, in close proximity to, or integrated as part of the processor 110. The computing system 100 can copy data from the memory 115 and/or the storage device 130 to the cache 112 for quick access by the processor 110. In this way, the cache 112 can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing system 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing system 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

The BMC (baseboard management controller) 138 can be a specialized microcontroller or processor on the system 100. In some cases, the BMC 138 can be part of an Intelligent Platform Management Interface (IPMI). Moreover, in some cases, the BMC 138 can be embedded on a motherboard or main circuit board of the system 100. The BMC 138 can manage the interface between system management software and platform hardware. Different types of sensors built into the computing system 100 can report to the BMC 138 on parameters such as temperature, cooling fan speeds, power status, operating system (OS) status, and so forth. The BMC 138 can monitor the sensors and send alerts to an administrator via a network interface, such as communication interface 140, if any of the parameters do not stay within preset limits or thresholds indicating a potential failure or error of the computing system 100. The administrator can also remotely communicate with the BMC 138 to take some corrective action, such as resetting or power cycling the computing system 100, to restore functionality.

Flash memory 142 can be an electronic non-volatile computer storage medium or chip which can be used by the computing system 100 for storage and/or data transfer. The flash memory 142 can be electrically erased and/or reprogrammed. Flash memory 142 can, for example, include erasable programmable read-only memory (EPROM), electrically erasable programmable read-only memory (EEPROM), read only memory (ROM), non-volatile random access memory (NVRAM), or complementary metal-oxide semiconductor (CMOS). The flash memory 142 can store the firmware 148 executed by the computing system 100 when the computing system 100 is first powered on, along with a set of configurations specified for the firmware 148. The flash memory 142 can also store configurations used by the firmware 148.

The firmware 148 can include a Basic Input/Output System or its successors or equivalents, such as an Extensible Firmware Interface (EFI) or Unified Extensible Firmware Interface (UEFI). The firmware 148 can be loaded and executed as a sequence program each time the computing system 100 is started. The firmware 148 can recognize, initialize, and test hardware present in the computing system 100 based on the set of configurations. The firmware 148 can perform a self-test, such as a Power-on-Self-Test (POST), on the computing system 100. This self-test can test functionality of various hardware components such as hard disk drives, optical reading devices, cooling devices, memory modules, expansion cards and the like. The firmware 148 can address and allocate an area in the memory 115, ROM 120, RAM 125, and/or storage device 130, to store an operating system (OS). The firmware 148 can load a boot loader and/or OS, and give control of the computing system 100 to the OS.

The firmware 148 of the computing system 100 can include a firmware configuration that defines how the firmware 148 controls various hardware components in the computing system 100. The firmware configuration can determine the order in which the various hardware components in the computing system 100 are started. The firmware 148 can provide an interface, such as an UEFI, that allows a variety of different parameters to be set, which can be different from parameters in a firmware default configuration. For example, a user (e.g., an administrator) can use the firmware 148 to specify clock and bus speeds, define what peripherals are attached to the computing system 100, set monitoring of health (e.g., fan speeds and CPU temperature limits), and/or provide a variety of other parameters that affect overall performance and power usage of the computing system 100.

While firmware 148 is illustrated as being stored in the flash memory 142, one of ordinary skill in the art will readily recognize that the firmware 148 can be stored in other memory components, such as memory 115 or ROM 120. However, firmware 148 is illustrated as being stored in the flash memory 142 as a non-limiting example for explanation purposes.

FIG. 1B illustrates another example computer system 150 having a chipset architecture that can be used in executing the described method(s) or operations, and generating and displaying a graphical user interface (GUI). Computer system 150 can include computer hardware, software, and firmware that can be used to implement the disclosed technology. Computer system 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

Moreover, chipset 160 can also communicate with firmware 195, which can be executed by the computer system 150 when powering on. The firmware 195 can recognize, initialize, and test hardware present in the computer system 150 based on a set of firmware configurations. The firmware 195 can perform a self-test, such as a POST, on the system 150. The self-test can test functionality of the various hardware components 155-190. The firmware 195 can address and allocate an area in the memory 175 to store an OS. The firmware 195 can load a boot loader and/or OS, and give control of the system 150 to the OS. In some cases, the firmware 195 can communicate with the hardware components 155-190. Here, the firmware 195 can communicate with the hardware components 155 and 165-190 through the chipset 160 and/or through one or more other components. In some cases, the firmware 195 can communicate directly with the hardware components 155-190.

It can be appreciated that example computer systems 100 and 150 can have more than one processor 110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2:
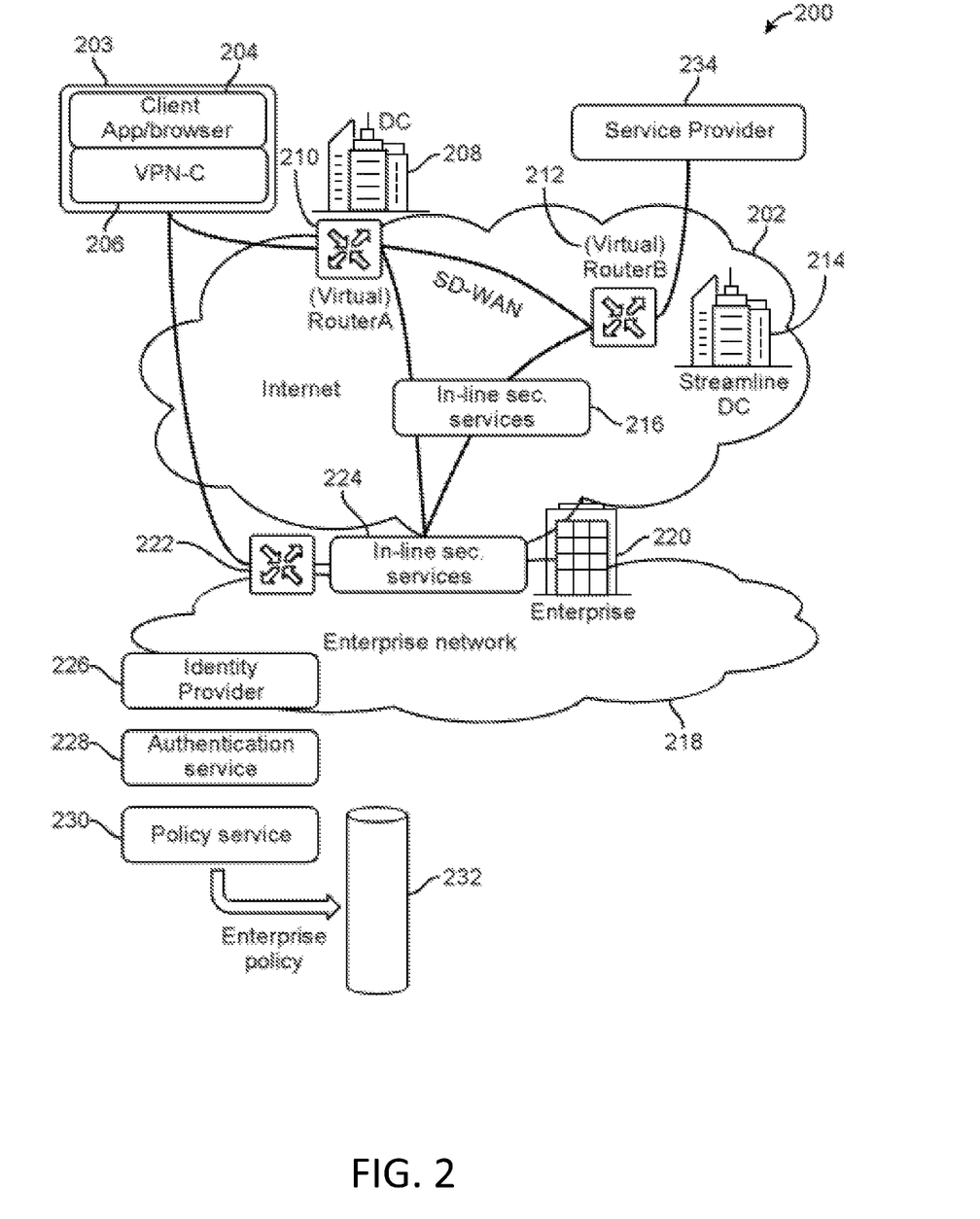
FIG. 2 illustrates a network environment in which the disclosed approach is applicable.

FIG. 2 illustrates a network environment in which the disclosed approach is applicable to provide verified network communication paths between a VPN application and services. Reference is first made to FIG. 2 that shows the overall security architecture 200 and entities involved in the techniques presented herein. The following entities collaborate in offering the verified networking service.

A client 204 accesses a service provider 234 through a TLS (transport layer security)-based HTTP (or other) connection. A VPN client (VPN-C) 206 hosted on a computing device 203 (e.g. mobile device) provides access to the (overlay) network. The VPN client 206 may be, by way of example only, a Cisco AnyConnect™ application, or other VPN client application. One or more (virtual) routers (A and B) 210, 212, possibly implementing a SD-WAN or other routed network, provide connectivity to the cloud in general or to a specific cloud service associated with a service provider 234. An Identity Provider 226 is responsible for providing (web) credentials, extended with security assertions (e.g., SAML (security assertion markup language) statements). An Authentication Service 228 authenticates, possibly by using multi-factor authentication, the enterprise's employee. This may be provided, for example, by way of a DUO (two-factor authentication) service. A Policy Service 230 provides a policy 232 which describes routing approaches and disposition of flows originating from the computing device 203. This disposition may indicate what SD-WAN VPNs to use per destination, may indicate what way-points and/or inline services and/or network routers to pass through to enforce on flows. The service provider 234 provides some type of cloud service. The cloud service can be of any type and only generally needs to be accessed by the browser or application 204 on the computing device 203. Data centers 208, 214 are also shown as being part of the overall architecture 200.

The methodology may be described by way of example. Consider in an environment 200 having a service offering that includes a cloud service associated with the service provider 234, a browser 204 on a computing device 203 that is used to navigate to the cloud service of the service provider 234, a single-sign-on service including of an identity provider 226 used to provide web credentials to the browser 204 for access, an authentication service 228 and a policy service 230 (which accesses a policy 232), a VPN (virtual private network) client 206 hosted on the computing device 203 and a SD-WAN (software-defined wide area network) network overlay.

The example use case, although others are also possible, is that a determination is made by the VPN client 206 (based on the policy service 203) on whether to direct the traffic flow over the public network or over the enterprise's private network, what DNS server to direct the traffic towards, and how the traffic would reach that DNS server. The browser 204 should then be provided instructions that would allow it to navigate successfully to the web service provided by the service provider 234. The instructions will allow the browser 204 to access a resource, using for example the web-credentials from the single-sign-on service, such that the SD-WAN network and VPN client 206 are used to carry the corresponding HTTP flow between the browser 204 and the cloud service on the service provider 234. The HTTP flow can pass through zero, one, or more way-points, in-line services 216, 224 and/or routers 210, 222, 212 as it travels between the browser 204 and the cloud service on the service provider 234. This is called a verified network flow path.

The VPN client 206 may or may not be tampered with whereby the posture of the computing device 203 may be substandard. The approach disclosed herein provides that the web-credentials associated with the flow of data through the network 200 must stipulate that, for the browser 204 to successfully interact with the resource managed by the cloud service, the flow must be routed at least across the VPN client 206 and SD-WAN. Then, as the flow finds its way to the cloud service at the service provider 234, the cloud service can be rejected or accepted based on the actual path taken by a flow. When the flow provably routes through the proper pre-selected way-points, in-line service and networks, the flow is accepted by the cloud service.

Example enterprise use cases for the enterprise service include the following. Assume an enterprise 220 operating an enterprise network 218 defines two classes of employees: "gold" and "bronze" class employees. "Gold" employees may be allowed for direct connectivity across the VPN client 206 and SD-WAN network to the cloud service, whereas a "bronze" user may have their traffic first inspected by a deep-packet inspection function, routed through a firewall and other traffic inspection function. On the other hand, another cloud service at the service provider 234 may be reached by the VPN client 204 routing the traffic directly across the Internet 202. When an employee requests web-credentials to access a service, the credentials only encode that the flow needs to be sent over the SD-WAN, whereas a "bronze" web-credential describes that the flow is only acceptable if the flow's TLS (transport layer security) session contains proof it has been handled by the in-line services 216, 224. If an enterprise operations or security team so desires, they may change the routing of flows dynamically and demote a "gold" user to "bronze" or vice versa and the service can still accept or reject incoming calls depending on the route the flow took across the interconnect. The changing can be based on machine learning, predictive algorithms, randomly, based on data flow, applications used, time of day, or any other factors that can change the classification of users with respect to whether to consider the route of the data flow as part of the determination regarding whether to enable access to a service.

Furthermore, the enterprise 220 operating the enterprise network 218 can also define the type of cloud services that the different employees are allowed to directly connect across the VPN client 206 and SD-WAN network or alternatively be required to be inspected by the deep-packet inspection function and routed through a firewall. Furthermore, the type of cloud services can also be used to determine whether the traffic from the employee using the VPN client 206 can be sent over public networks (e.g. SD-WAN) or should use private/intra-network communications to connect the user with the cloud service.

Details regarding what cloud services employees are able to access using the VPN client 206 and how the employees connect to the cloud services are expressed through different policies. Typically policies are associated with different IP addresses that correspond to specific locations on the internet. Because IP addresses can change over time (as the service may be relocated to different source locations) and employees may not rely on the IP address to identify what services they wish to access (e.g. using IP addresses to locate services is non-intuitive), the present invention instead utilizes domain names. Domain names are more intuitive to employees and are generally understood. For example, individuals generally understand "google.com" as corresponding to a search engine. Few (if any) individuals would enter its corresponding IP address (e.g. http://74.125.224.72/) to access the same website. In addition, even if the IP address for certain websites change between VPN sessions, domain names for the corresponding website/web service tend to remain the same. Thus policies that are based on domain names would be an improvement over the use of IP addresses. The present disclosure (as illustrated in the next figures) describe how implementation of domains would be possible.

Figure 3A:
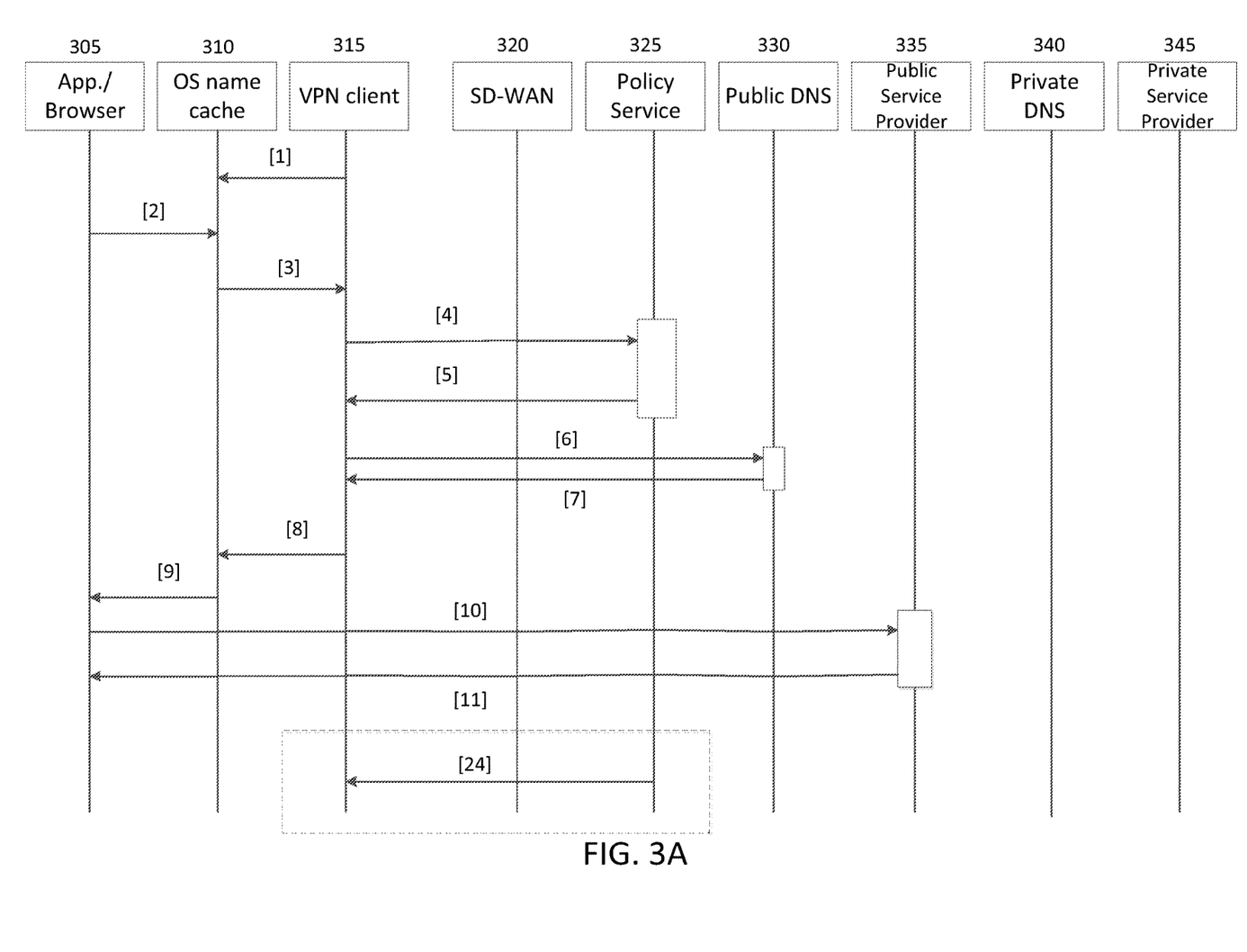
FIG. 3A and FIG. 3B illustrate exemplary call flows for establishing a verified network flow with all participants when applying the principles of this disclosure.
Figure 3B:
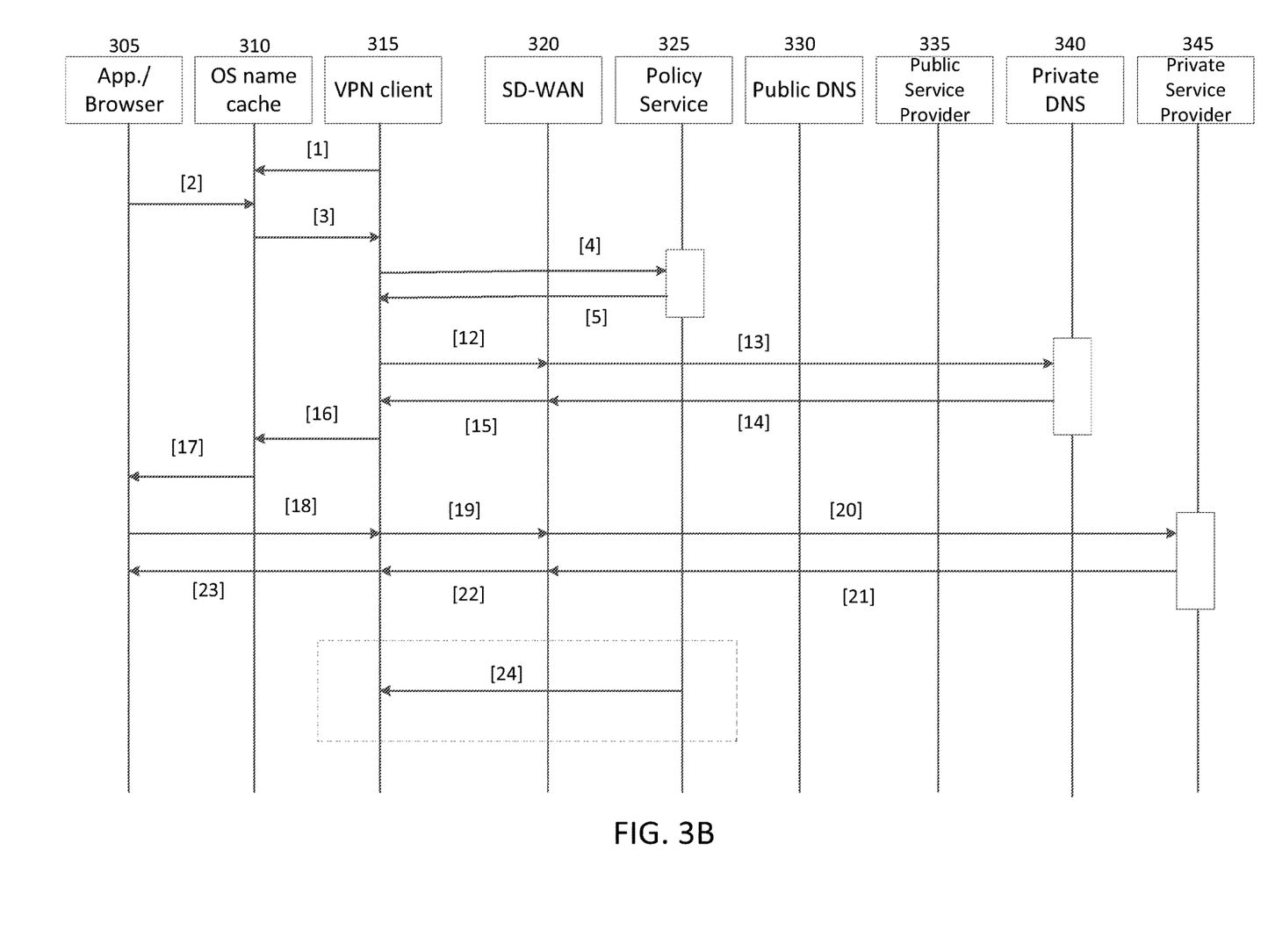

FIG. 3A and FIG. 3B illustrate exemplary call flows for establishing a verified network flow with all participants when applying the principles of this disclosure. As illustrated in the figures, the participants include: an application/browser 305 that is used to initiate a call for a particular network service on the Internet, an operating system's name cache 310 that keeps resolved names (e.g. IP addresses) from previous calls to the Internet for a pre-determined period of time, the VPN client 315 that classifies flows and routes the flows from the computing device across a network, the SD-WAN 320 that carries traffic across the Intranet (e.g. between a client and private servers), the policy server 325 that maintains the disposition for packet flows, and corresponding public/private DNS service 330/340 and public/private service provider 335/345 based on whether the network-based service being requested by the user pertains to a public Internet-based network service or private Intranet-based network service. The details regarding each of the participants and how they interact with each other will be provided below.

In both the exemplary call flows illustrated in FIG. 3A and FIG. 3B, messages [1]-[5] are both the same. Specifically these steps involve initializing the VPN client 315 and communicating with the policy service 325 to determine the appropriate disposition. After message [5], the VPN client 315 will be instructed to proceed with establishing the call flow over via local break-out (e.g. over the public Internet) as illustrated in FIG. 3A or via SD-WAN routing (e.g. over a private network) as illustrated in FIG. 3B.

With reference to FIG. 3A, the process for establishing the network flow begins with the VPN client 315 being activated and directing the operating system's name cache 310 to be cleared via message [1]. The clearing of the operating system's name cache 310 forces the VPN client 315 to perform a DNS query (as a DNS proxy) instead of relying on past resolved IP addresses that may be stored in the cache.

Once the operating system's name cache 310 has been cleared, the VPN client 315 can be configured as a DNS proxy and operate as such in connection with the user's request to access to a network-based service on the Internet. In this way, the VPN client 315 is able to intercept IP addresses when resolving domain name requests The user's request may be provided from an application or browser 305 to the operating system's name cache 310 (via message [2]). An example user request provided to the application or browser 305 may be a domain name or fully qualified domain name (FQDN). The operating system's name cache 310 will attempt to resolve the domain name (e.g. DNS request) that was provided by the user from the application or browser 305 via message [2]. Because the operating system's name cache 310 was cleared via message [1], the operating system's name cache 310 will inform the VPN client 315, acting as DNS proxy, that no IP addresses are available that correspond to the user's request via message [3].

At this point, the VPN client 315 will forward the DNS query request (via message [4]) to the policy service 325 in an attempt to resolve the network path for the DNS query. Specifically, the policy service 325 will be providing the VPN client 315 (via message [5]) what path to use when routing the user VPN client to the desired destination (whether it be at a public service provider 335 or private service provider 345). When the policy service 325 resolves the DNS query request from the VPN client 315, the policy service 325 evaluates a number of different factors to determine the appropriate disposition to send to the VPN client 315 (via message [5]). For example, a policy of the policy service 325 may look at factors such as the requested domain name (e.g. destination) being requested, the computing device posture (e.g. security, type), the geo-location of the user, the access provider, and the state of the user (e.g. classification of the user as an employee for an enterprise). Based on evaluating these various factors above (as well as other factors that may also be possible), the policy service 325 informs the VPN client 315 where and how to forward the DNS query request so that it can be properly resolved (via message [5]).

At least based on the present figures, there are at least two possible dispositions that the policy service 325 can provide to the VPN client 315. In FIG. 3A, the policy service 325 will direct the VPN client 315 to route the DNS query request using the public Internet. In contrast, FIG. 3B shows that the policy service 325 will direct the VPN client 315 to route the DNS query request using a private Intranet (via the SD-WAN 320). FIG. 3A and FIG. 3B illustrates two exemplary dispositions, although there may be many other possible dispositions as well. Aside from determining whether a request can be routed over public Internet or private Intranet, other dispositions may also be able to identify which DNS server should be contacted to resolve a domain name request.

The policies of the policy service 325 that are used to determine where and how the VPN client 315 forwards the DNS query request may be created and modified by, for example, administrators within an enterprise. These administrators may be responsible for managing the policy service 325 so as to define how an enterprise's employees may access different cloud-based services or web sources over the Internet or Intranet for security purposes.

In connection with the first possible disposition being over the public Internet (e.g. FIG. 3A), the VPN client 315 receives instructions from the policy service 325 to provide the DNS request query to the public DNS service 330 associated with the Internet (in message [6]). The public DNS service 330 is able to resolve the DNS query request provided by the VPN client 315 and subsequently provides one or more IP addresses back to the VPN client 315 (in message [7]). The one or more IP addresses can then be sent to the operating system's name cache (in message [8]) as well as recorded in a routing table at the VPN client 315. The recordation of the IP addresses (as well as the associated disposition provided by the policy service 325) will be used for this and future user requests associated with the domain name initially provided in message [2] via the application or browser 305. Furthermore, the IP addresses are used to determine where and how to route traffic from the application or browser 305 to the destination associated with the IP address. The associated IP addresses are then provided to the application or browser 305 in message [9].

The IP address provided to the application or browser 305 informs the VPN client 315 where the flow from the application or browser 305 should be routed to across the VPN client 315. Specifically, with respect to FIG. 3A, the IP address corresponds to a location within the Internet for the particular public service provider 335 associated with the user initial request (in message[2]). The flow from the application or browser 305 can then be routed to the public service provider 335 (via messages [10] and [11]) that is associated with that IP address.

The IP addresses that are recorded in the operating system's name cache 310 may remain available for a pre-determined period of time (e.g. time-to-live period). Any subsequent time when the user requests the same domain name, the recorded IP address can be used instead of having to communicate with the policy service 325 each time. The pre-determined period of time may be encoded with the IP address provided by the DNS server via message [7]. Once the pre-determined period of time expires, the VPN client 315 may be instructed to remove the IP address from its own routing table as well as from the operating system's name cache 310. Any future calls to that particular domain name may require the VPN client 315 to again communicate with the policy service 325 to obtain updated information after the pre-determined period of time has expired.

Furthermore, routing dispositions can also change at any time (e.g., reclassification of the user, changes in computing device posture, changes in the IP address of the service provider). If such change occurs, the VPN client 315 can be notified by the policy service 325 regarding the change. The routing table associated with the VPN client 315 can be updated based on the information provided by the policy service 325 via message [24] (e.g. changed IP address can be provided for the routing table). Updates to the routing disposition of the VPN client 315 should only be made if the current flows to be modified are not currently in use as there are no ways to dynamically reallocate or update existing flows in real-time without negatively affecting flows that are already in use. Rather, the update (via message [24]) would be ideally performed at the next opportunity when the affected flows are not in use.

As noted above, the process for establishing the network flow with the VPN client 315 as illustrated in FIG. 3B with respect to messages [1]-[5] is the same as FIG. 3A. The operating system's name cache 310 is cleared (via message [1]), the user's domain name request is provided from the application or browser 305 to the operating system's name cache 310 in message [2], an initial indication that there are no corresponding IP addressed stored in the operating system's name cache 310 (since it was just cleared via message [1]) is provided to the VPN client 315 in message [3], the user's domain name request/DNS query is forwarded to the policy service 325 in message [4], and based on various factors, the policy service 325 provides a particular disposition back to the VPN client 315 via message [5]. The difference in FIG. 3B (compared to FIG. 3A) is that the policy associated with the policy service 325 would instruct the VPN client 315 to use SD-WAN routing 320 to connect to a private/Intranet network instead of routing to the public Internet in message [5].

In FIG. 3A, the policy service 325 provides directions (via message [5]) to the VPN client 315 instructing that the VPN client 315 should forward the user's domain name request/DNS query to a public DNS 330 (as illustrated in message [6]). In contrast for FIG. 3B, the policy service 325 provides directions (via message [5]) to the VPN client 315 instructing that the VPN client 315 should forward the user's domain name request/DNS query to a private DNS 340 (as illustrated in messages [12] and [13]). In particular the policy service 325 informs the VPN client 315 the particular location in the private network/Intranet of the private DNS 340. The user's DNS query is then routed from the VPN client 315 through the SD-WAN network 320 via message [12] in order to gain access to the private network/Intranet. The user's DNS query is then routed to the particular address provided by the policy service 325 (in message [5]) as illustrated in message [13]). At the private DNS 340, the user's domain name request is resolved with one or more IP addresses. The IP addresses are then provided back to the VPN client 315 via messages [14] and [15]. Much like in messages [8] and [9] of FIG. 3A, the VPN client 315 will similarly provide the one or more IP addresses to the operating system's name cache (in message [16]) and record the information in the routing table at the VPN client 315. Furthermore, the IP addresses are also provided to the application or browser 305 via message [17].

However, instead of routing between the application or browser 305 and the public service provider 335 as illustrated in FIG. 3A, the routing with the application or browser 305 will go through the VPN client 315 (in message [18]). Using the VPN client 315, the flow from the application or browser 305 will proceed through the SD-WAN network 320 (in message [19]) and ultimately to the IP address within the private network/Intranet associated with the private service provider 345 (in message [20]). The information from the private service provider 345 can then be provided back to the application or browser 305 in the opposite direction going through the SD-WAN network 320 (in message [21]) and the VPN client 315 (in message [22]) before being received at the application or browser 305 (in message [23]).

Figure 4:
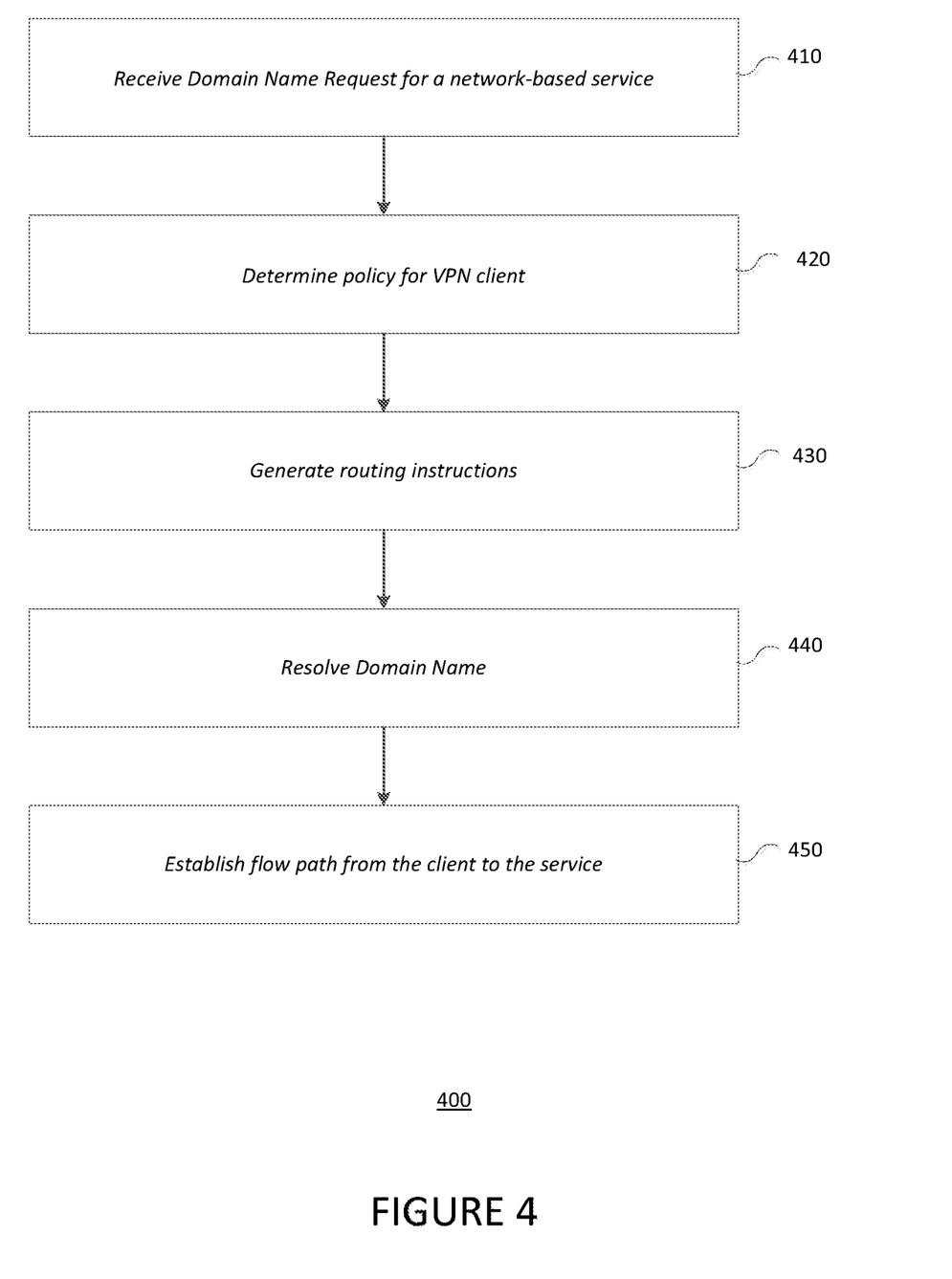
FIG. 4 illustrates an example method according to an aspect of this disclosure.

FIG. 4 illustrates an example method according to an aspect of this disclosure. In summary, the method provides for routing data flows between a client device and a service provider over the Internet based on pre-determined policies at a policy service. The routing policy can, in one example, be based on a priority associated with the user, on a user service level agreement, a user group or department, characteristics of the client device, and/or a geographic location of the user or service provider.

The example method may be initiated upon receiving a domain name request to access a network-based service from a client application or browser operating on a client device via step 410. The network-based service may exist on the public Internet, a private Intranet, or both. Where the domain name request is forwarded to and how the domain name request is resolved is based on a determination of what the appropriate policy the VPN client would be assigned to.

In step 420, the method next determines the appropriate policy for the VPN client. By communicating with the policy service, an evaluation of various factors associated with the VPN client (e.g. the user using the VPN client or the computing device running the VPN client) is made to identify the appropriate policy that describes how the routing of the flow from the client device will be performed and how the domain name request will be resolved. Exemplary factors include (but are not limited to) the identity and posture of the user, the geo-location of the user, the service provider associated with the domain name request, and the device posture. The determined policy from the policy service will instruct where and how the VPN client should forward the domain name request to be resolved at a particular DNS service.

In step 430, based on the determined policy from the policy service, instructions will be generated for the VPN client that will instruct where and how the VPN client should forward the domain name request. For example, the generated instructions will identify whether such instructions will be provided over the public Internet or over a private Intranet and the corresponding DNS service (e.g. public or private) to forward the domain name request to.

In step 440, the domain name request is forwarded from the VPN client to the DNS service identified by the routing instructions generated in step 430. The DNS service that receives the domain name request resolves the request and provides one or more IP addresses that can be sent back to the VPN client. The VPN client saves these IP addresses in a routing table for a pre-determined period of time. Furthermore, the VPN client provides the IP addresses to the application or browser so that the application or browser can locate the network-based service corresponding to the domain name request received in step 410.

In step 450, the application or browser establishes an appropriate routing of the data flow between the client device and the network-based service. The destination associated with the domain name request is identified based on the IP address received in step 440. The particular route between the client device and the network-based service's destination is defined by the generated routing instructions provided via step 430.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, compact disc read-only memory (CD-ROM), digital versatile disc (DVD), memory devices, etc.) of a stationary or portable program product apparatus or device for use with stand-alone systems or systems connected by a network or other communications medium.

The communication network may be implemented by any number of any types of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options) where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:
1. A method for routing traffic, the method comprising:
   instructing a virtual private network (VPN) client to clear any previously resolved domain-name based requests stored in memory;
   receiving, at the VPN client, a domain name-based request to access a network-based service at a client device, wherein the VPN client is forced to operate as a DNS proxy in response to clearing of the any of the previously resolved domain-name based requests stored in the memory;
   forwarding the domain name-based request from the VPN client acting as the DNS proxy to a policy service;
   identifying, by the policy service, a policy for the VPN client of the client device based on receipt of the domain name-based request at the policy service, wherein the policy provides instructions to the VPN client for routing a flow path between the client device and the network-based service;

generating, by the policy service, routing instructions for the VPN client of the client device based on the instructions provided by the identified policy, wherein the routing instructions include identifying whether to route the flow path from the VPN client over a private network or a public network;

routing, from the VPN client, the domain name-based request to a domain name system (DNS) to obtain IP addresses associated with the network-based service, wherein the DNS used to resolve the domain name-based request is based on the routing instructions provided by the identified policy, and wherein the IP addresses are stored in a routing table associated with the VPN client; and establishing the flow path between the client device and the network-based service, wherein the VPN client routes the flow path to the network-based service using IP addresses stored in the routing table of the VPN client and in accordance with the generated routing instructions.

2. The method of claim 1, wherein the identified policy is one of a plurality of different policies associated with the policy service, and wherein the identified policy is selected from the plurality of different policies based on one or more factors associated with a user, the client device, and the network-based service.

3. The method of claim 2, wherein the one or more factors associated with the user includes an identity of the user, and wherein the identity of the user including whether the user is an employee of an enterprise of which the network-based service is associated with.

4. The method of claim 2, wherein the one or more factors associated with the user includes a geo-location of the user.

5. The method of claim 2, wherein the one or more factors associated with the client device includes a posture of the client device, and wherein the posture includes whether the client device is a secure computing device.

6. The method of claim 1, wherein the routing instructions include identifying whether to resolve the domain name-based request at a private DNS or a public DNS.

7. The method of claim 1 further comprising updating routing instructions for the VPN client based on a change in the identified policy for the VPN client.

8. The method of claim 7, wherein the updates to the routing instructions for the VPN client are performed when the flow path between the client device and the IP address affected by the updated routing instructions is not currently in use.

9. The method of claim 1, wherein the routing instructions include a pre-determined time period with each of the IP addresses, and wherein after the pre-determined time period expires the VPN client is instructed to discard IP address stored in the routing table.

10. A system for routing traffic, the system comprising:
a processor; and
a computer-readable device storing instructions which, when executed by the processor, cause the processor to perform operations comprising:
  instructing a virtual private network (VPN) client to clear any previously resolved domain-name based requests stored in memory;
  receiving, at the VPN client, a domain name-based request to access a network-based service at a client device, wherein the VPN client is forced to operate as a DNS proxy in response to clearing of the any of the previously resolved domain-name based requests stored in the memory;
  forwarding the domain name-based request from the VPN client acting as the DNS proxy to a policy service;
  identifying, by the policy service, a policy for the VPN client of the client device based on receipt of the domain name-based request at the policy service, wherein the policy provides instructions to the VPN client for routing a flow path between the client device and the network-based service;
  generating, by the policy service, routing instructions for the VPN client of the client device based on the instructions provided by the identified policy, wherein the routing instructions include identifying whether to route the flow path from the VPN client over a private network or a public network;
  routing, from the VPN client, the domain name-based request to a domain name system (DNS) to obtain IP addresses associated with the network-based service, wherein the DNS used to resolve the domain name-based request is based on the routing instructions provided by the identified policy, and wherein the IP addresses are stored in a routing table associated with the VPN client; and
  establishing the flow path between the client device and the network-based service, wherein the VPN client routes the flow path to the network-based service using the IP addresses stored in the routing table of the VPN client and in accordance with the generated routing instructions.

11. The system of claim 10, wherein the identified policy is one of a plurality of different policies associated with the policy service, and wherein the identified policy is selected from the plurality of different policies based on one or more factors associated with a user, the client device, and the network-based service.

12. The system of claim 10, wherein the instructions further include updating routing instructions for the VPN client based on a change in the identified policy for the VPN client, and wherein the updates to the routing instructions for the VPN client are performed when the flow path between the client device and the IP address affected by the updated routing instructions is not currently in use.

13. The system of claim 10, wherein the routing instructions include identifying whether to resolve the domain name-based request at a private DNS or a public DNS.

14. A computer-readable device storing instructions which, when executed by a computer device, cause the computer device to perform operations comprising:
  instructing a virtual private network (VPN) client to clear any previously resolved domain-name based requests stored in memory;
  receiving, at the VPN client, a domain name-based request to access a network-based service at a client device, wherein the VPN client is forced to operate as a DNS proxy in response to clearing of the any of the previously resolved domain-name based requests stored in the memory;
  forwarding the domain name-based request from the VPN client acting as the DNS proxy to a policy service;
  identifying, by the policy service, a policy for the VPN client of the client device based on receipt of the domain name-based request at the policy serve, wherein the policy provides instructions to the VPN client for routing a flow path between the client device and the network-based service;
  generating, by the policy service, routing instructions for the VPN client of the client device based on the instructions provided by the identified policy, wherein the routing instructions include identifying whether to route the flow path from the VPN client over a private network or a public network;

routing, from the VPN client, the domain name-based request to a domain name system (DNS) to obtain IP addresses associated with the network-based service, wherein the DNS used to resolve the domain name-based request is based on the routing instructions provided by the identified policy, and wherein the IP addresses are stored in a routing table associated with the VPN client; and establishing the flow path between the client device and the network-based service, wherein the VPN client routes the flow path to the network-based service using IP addresses stored in the routing table of the VPN client and in accordance with the generated routing instructions.

15. The computer-readable device of claim 14, wherein the identified policy is one of a plurality of different policies associated with the policy service, and wherein the identified policy is selected from the plurality of different policies based on one or more factors associated with a user, the client device, and the network-based service.

16. The computer-readable device of claim 14, wherein the instructions further include updating routing instructions for the VPN client based on a change in the identified policy for the VPN client, and wherein the updates to the routing instructions for the VPN client are performed when the flow path between the client device and the IP address affected by the updated routing instructions is not currently in use.

17. The computer-readable device of claim 14, wherein the routing instructions include identifying whether to resolve the domain name-based request at a private DNS or a public DNS.

* * * * *